(No Model.)                                                                 7 Sheets—Sheet 1.
R. WEISS.
EMBROIDERING MACHINE.

No. 573,119.                                              Patented Dec. 15, 1896.

Witnesses
J. M. Fowler Jr.
Alvan Macauley

Inventor
Rudolph Weiss,
By Church & Church
his Attorneys

THE NORRIS PETERS CO., PHOTO-LITHO., WASHINGTON, D. C.

(No Model.) 7 Sheets—Sheet 2.
R. WEISS.
EMBROIDERING MACHINE.

No. 573,119. Patented Dec. 15, 1896.

Witnesses:
J. M. Fowler Jr.
Alvah Macauley

Inventor
Rudolph Weiss,
By Church & Church
his Attorneys

(No Model.) 7 Sheets—Sheet 3.
R. WEISS.
EMBROIDERING MACHINE.

No. 573,119. Patented Dec. 15, 1896.

Fig. 6.

(No Model.) 7 Sheets—Sheet 7.
R. WEISS.
EMBROIDERING MACHINE.

No. 573,119. Patented Dec. 15, 1896.

Witnesses:
J. M. Fowler Jr.
Thomas Durant.

Inventor
Rudolph Weiss,
By Church & Church
his Attorneys.

THE NORRIS PETERS CO., PHOTO-LITHO., WASHINGTON, D. C.

UNITED STATES PATENT OFFICE.

RUDOLPH WEISS, OF NOTTINGHAM, ENGLAND.

EMBROIDERING-MACHINE.

SPECIFICATION forming part of Letters Patent No. 573,119, dated December 15, 1896.

Application filed July 7, 1891. Serial No. 398,727. (No model.) Patented in England June 4, 1890, No. 8,669, and June 9, 1891, No. 9,760; in Switzerland June 25, 1891, No. 3,973, and in Germany June 30, 1891, No. 66,724.

*To all whom it may concern:*

Be it known that I, RUDOLPH WEISS, a citizen of the Republic of Switzerland, residing at Nottingham, in England, have invented certain new and useful Improvements in or Relating to Embroidery-Machines, (for which I have obtained patents in England, No. 8,669, dated June 4, 1890, and No. 9,760, dated June 9, 1891; in Germany, No. 66,724, dated June 30, 1891, and in Switzerland, No. 3,973, dated June 25, 1891,) of which the following is a specification.

This invention relates more especially to improvements in shuttle embroidery-machines in which series of needles are employed, each needle producing a corresponding design on a tissue secured to a frame, which frame is moved by a pantograph or other means; and it has for its object the production of an improved quality of embroidery on such machines.

It will be best understood by reference to the accompanying drawings, in which—

Figure 1:
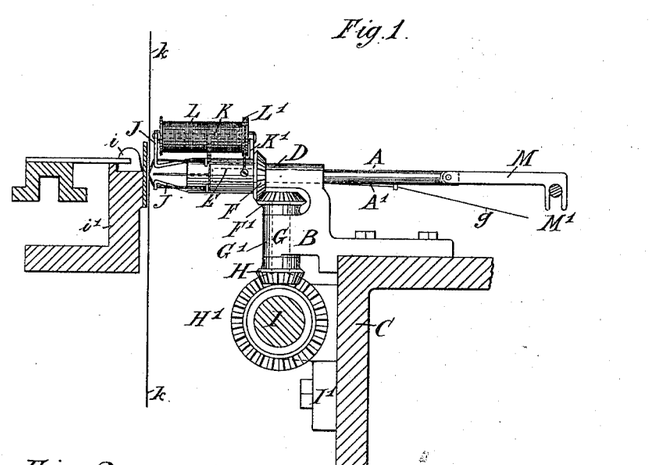
Figure 1 is a transverse section of part of a tier of needles, showing cording apparatus and tissue and a modified form of gearing.
Figure 2:
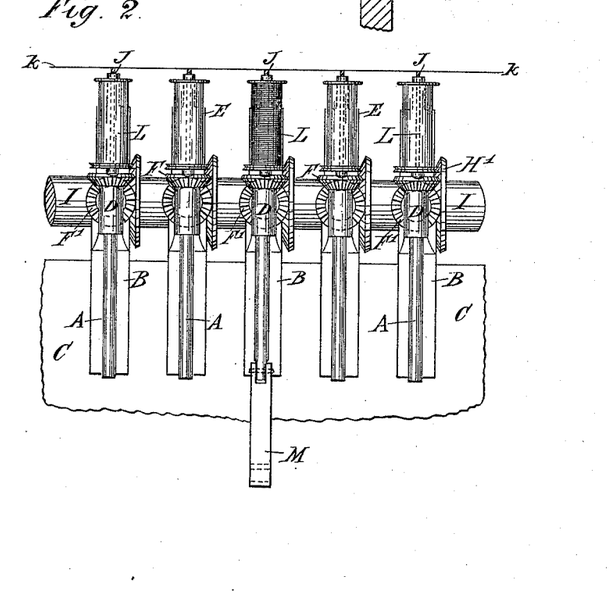
Fig. 2 is a plan of part of Fig. 1.
Figure 3:
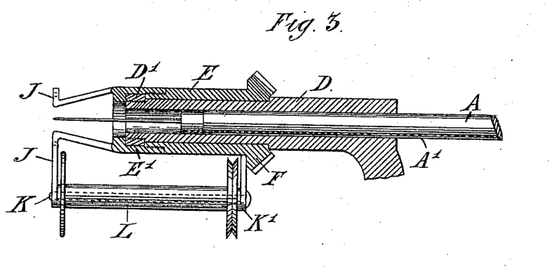
Fig. 3 is a vertical section taken centrally along one of the needle-bars.

Referring to Figs. 1, 2, and 3, the needle-bars A are carried in brackets B, secured to the rail C, forming part of the framing. The brackets are preferably formed with sleeves or bosses D, concentric with the needle-bars, and form bearings for the sleeves E of each cording or braiding apparatus and around which the sleeves may turn or reciprocate as desired. The sleeves E are provided with bevel-wheels F, gearing with wheels F', secured on the upper end of shafts G, carried by bearings G' of the brackets B. Secured to the lower ends of the shafts G are bevel-wheels H, gearing with bevel-wheels H', secured on the longitudinal shaft I, carried in bearings I', secured to the rail C. The cording apparatus for each needle is thus simultaneously operated by the shaft I, and by this means the requisite motion may be communicated to the sleeves E of each cording apparatus.

The sleeves E may be retained in position by rings D', screwed on or otherwise secured to the ends of the sleeves D. Attached to the ends of the sleeves E are sleeves or bosses E', carrying cord or braid guides J, which may be extended to form bearings for one end of the pins K, carrying the cord or braid spools L, the other end of the pins K being carried by brackets or arms K', secured to the sleeves E. Tension may be applied to the cord or braid by a spring bearing on each spool L or by cord L', lying in a groove formed in one end of the spools, or the cord or braid may be passed through a suitable tension device secured at any suitable part of each cording or braiding apparatus.

The needle-bars A may be fastened or pivoted in the usual manner to a longitudinal bar which is moved to and from the tissue, or they may be connected by links M, pivoted to the needle-bars at one of their ends and each provided at its outer end with a fork M', which engages with the longitudinal bar or with a lever secured to and operated by a rocking shaft. By this arrangement each needle-bar may be removed so as to facilitate the threading of the needles and without necessarily stopping the machine. Provision is made for the passage of the needle-thread *g* by forming a longitudinal groove A' in the needle-bar or in the needle-bar bearing D, as shown in dotted lines, Figs. 1 and 3.

Figure 4:
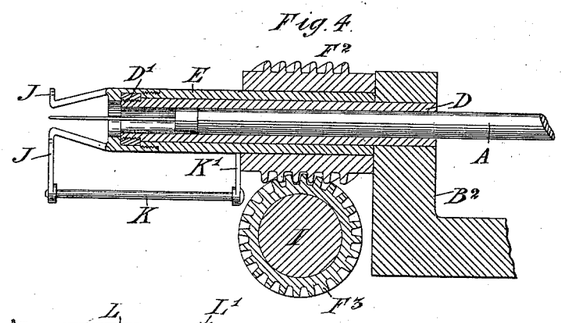
Figs. 4 and 5 are side elevations, partly in section, showing the preferred form of gearing.

In the construction illustrated in Fig. 4 the sleeves D, forming bearings for the needle-bars A, and the sleeves E of each cording apparatus are secured in a longitudinal bar $B^2$, secured to the rail C, and motion is transmitted from the longitudinal shaft I to the cording devices by means of skew-bevel wheels $F^2$ $F^3$, secured to the sleeves E and the shaft I, respectively.

Figure 5:
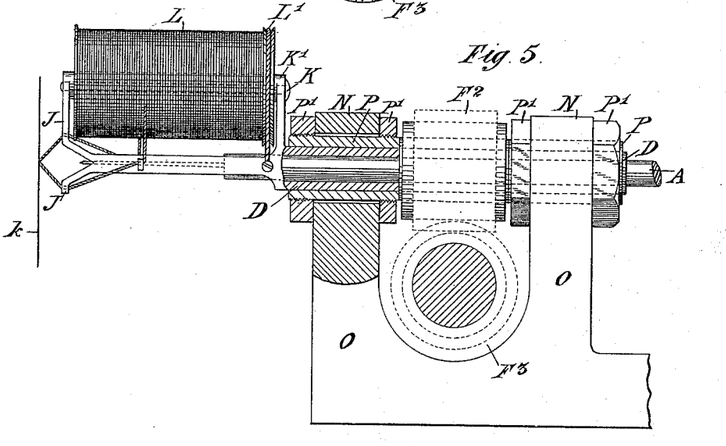

As shown in Fig. 5, each of the sleeves D, forming a bearing for one of the needle-bars A, may be carried in bearings N N in a bracket O or a longitudinal bar of a similar section secured to the rail C. The bearings are preferably fitted with adjustable bushes P, secured by nuts P'. The skew-bevel wheels $F^2$ are secured between the bearings N N to the sleeve D, which in this case carries the thread-guide J and spool L. The latter may also be of an increased diameter, and consequently of a greater capacity by reason of the reduced size of the sleeve D and by cutting part of it away, as shown.

In cording or braiding the cord or braid is placed in position by the guide J, and this may have more or less than one complete revolution round the needle-thread, each stitch carrying the cord or braid and spool L with it. This movement may be continued in the same direction for each stitch or reversed each stitch, as required, according to the class of work. For example, two revolutions may be advisable. If I want to wind a narrow braid round the needle-thread for the purpose of forming what will appear to be a cord, the movement will have to be always in one direction. In some cases when attaching a cord to the tissue a reciprocating motion may be imparted to the thread-guide, so as to carry the cord first to one side of the needle and then to the other, the cord being secured by the needle-thread in a well-known manner.

Figure 6:
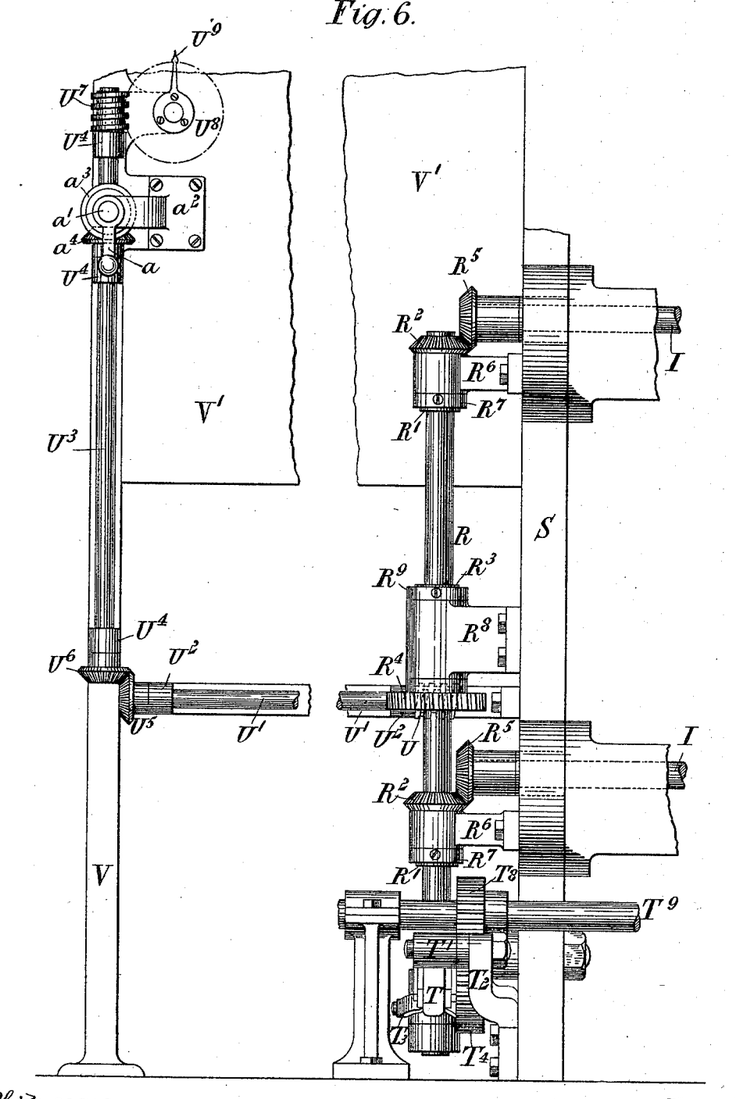
Fig. 6 is a front elevation, and Fig. 7 a side elevation, showing the mechanism by which the embroidering devices are operated, parts only of the embroidery-machine being shown in these two figures.
Figure 7:
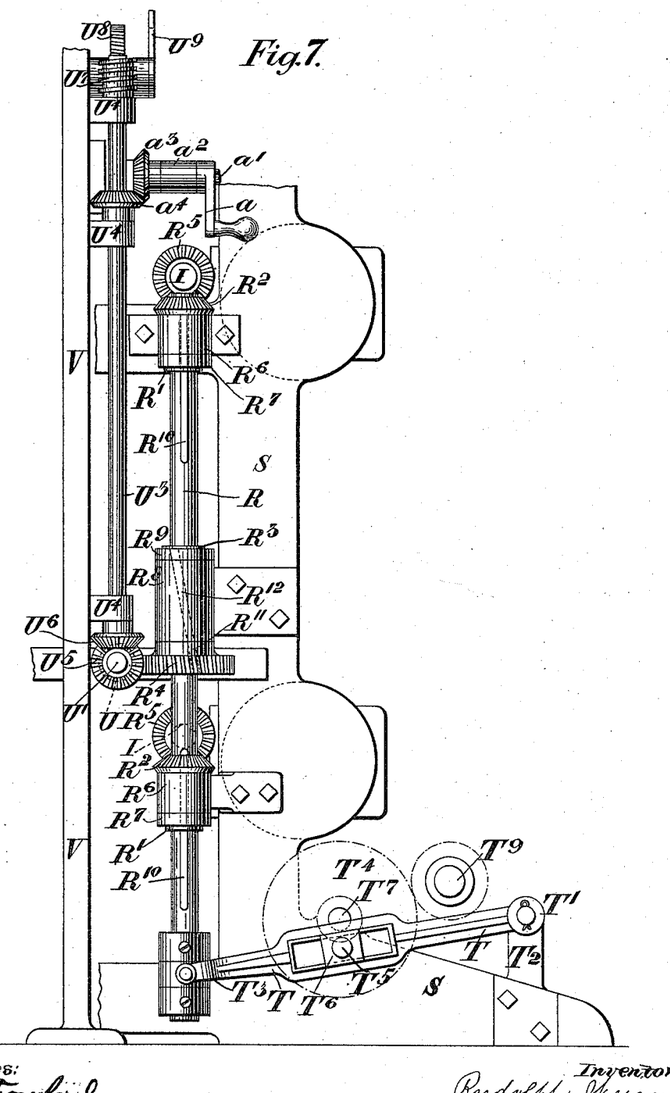
Figure 8:
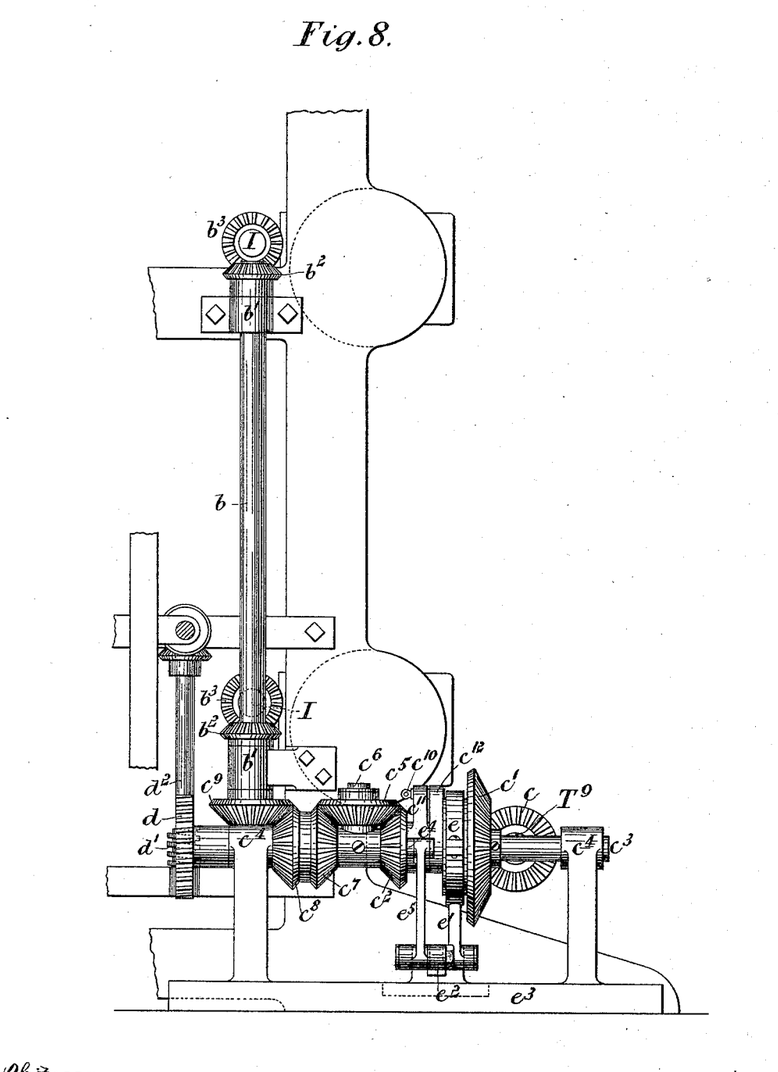
Fig. 8 is a side elevation of a modification, showing alternative arrangement for imparting motion to the cording or braiding guides.

The apparatus shown in Figs. 6, 7, and 8 is applied to an embroidery-machine with two tiers of needles, the cording or braiding devices in each tier being operated by one of the before-mentioned longitudinal shafts I.

As shown in Figs. 6 and 7, motion is communicated to the longitudinal shafts I, previously described, by means of a vertical shaft R. This shaft R reciprocates in the direction of its length within the sleeves R' of the bevel-wheels $R^2$ and the sleeve $R^3$ of the worm-wheel $R^4$. The two bevel-wheels $R^2$ are geared with corresponding wheels $R^5$, secured to the ends of the shafts I, and each wheel $R^2$ is carried in a bracket-bearing $R^6$, secured to the framing S by its sleeve R', which sleeve is held in the bearing by a collar $R^7$, secured thereto. The worm-wheel $R^4$ is also carried by its sleeves $R^3$ in the bracket-bearing $R^8$, secured to the framing S, the said sleeve being held in the bearings $R^8$ by a collar $R^9$, secured thereto. The shaft R is provided with projecting feather-keys $R^{10}$, which engage with corresponding keyways in the sleeves R' of the wheels $R^2$, and is also provided with a projecting stud $R^{11}$, working in a helical cam-groove $R^{12}$ in the sleeve $R^3$ of the worm-wheel $R^4$, as shown in dotted lines in Fig. 7.

The shaft R is reciprocated in the direction of its length by a lever T, pivoted at its outer end T' to the bracket $T^2$, secured to the framing S, and its free end is connected by a fork $T^3$ to a boss mounted loosely on the shaft R, as shown. The lever T may be actuated by a cam or, as shown, by a toothed wheel $T^4$, provided with a crank-pin $T^5$, pivoted in the sliding block $T^6$ of the lever T, the toothed wheel $T^4$ being mounted loosely on a fixed pivot $T^4$ and geared with a pinion $T^8$, secured to the main shaft $T^9$, from which the wheel $T^4$ receives a constant rotary motion.

The worm-wheel $R^4$, shaft R, and wheels $R^2$ are connected to each other and mounted as previously described, in order that by means of the said wheel $R^4$ the whole may be rotated bodily and a corresponding movement imparted by means of the shaft I to the cording-guides, that is, by rotating the wheel $R^4$ each cording-guide J may be moved to the right or left in a circular path around its needle, and may thus be placed at any point in that circular path prior to each stitch. This is called the "adjusting" movement and is only used when the direction in which the stitches are being made is changed.

In addition to being rotated by the wheel $R^4$ the shaft R, as previously described, has a reciprocating motion in the direction of its length. Now if the wheel $R^4$ be held stationary while the shaft R is reciprocated the action of the cam-groove $R^{12}$ in the sleeve $R^3$ of the wheel $R^4$ will impart to the said shaft a rotary reciprocating movement, which will be transmitted by the shaft I to the cording-guides J, and the latter will be reciprocated through an angular space of, say, ninety degrees. This may be called the "constant" movement.

It is obvious that while the wheel $R^4$ is held stationary the cording-guides J will continue to reciprocate between two fixed points, and if a stitch is made in a direction which is not within those two points the cord will engage with the needle-thread and would not be secured to the fabric. For example, we will suppose that the pantograph-frame is moved downward, so as to make successive stitches in a vertical line. The cording-guides J must in this case reciprocate above the needle in order to carry its cord across the path of the needle each stitch. We will now suppose that the direction of the movement of the pantograph-frame is changed horizontally toward the left. The cording-guides J must now reciprocate on the right side of the needle, and to effect this change the wheel $R^4$, with its sleeve $R^3$, must be moved through an angular space of ninety degrees in the required direction, that is, an angular movement of the wheel $R^4$ equal to the angular change in the direction of movement of the pantograph-frame.

The worm-wheel $R^4$ is turned by a worm U in engagement therewith, which worm is secured on a shaft $U'$, carried in bearings $U^2$, secured to the framing V, which latter may also support the pattern-board $V'$. The pattern-board $V'$ is in the same position as and is used in the same manner as an ordinary pantograph-board, an enlarged copy of the pattern being affixed thereto and followed with the pointer of the pantograph in the usual manner by an attendant.

A vertical shaft $U^3$ is carried in the bracket-bearings $U^4$, secured to the framing V, and this shaft is connected to the horizontal shaft $U'$ by bevel-wheels $U^5 U^6$. Secured to the upper end of the shaft $U^3$ is a worm $U^4$, engaging with a worm-wheel $U^8$, turning on a pivot or shaft secured to the framing V, the said wheel $U^8$ being provided with a pointer $U^9$. The worm $U^7$ and worm-wheel $U^8$ are arranged so that the movement of the latter is identical with the worm-wheel $R^4$ and sleeve $R^3$, and before commencing to work the pointer $U^9$ is adjusted so as to correspond with the center of the constant angular reciprocating movement of the cording-guides J.

The shaft $U^3$ may be turned by the pantograph-operator or an additional attendant by means of the crank-handle $a$, secured to a short shaft $a'$, carried in the bearings $a^2$, secured to the framing V, and secured to the inner end of which shaft $a'$ is a bevel-wheel $a^3$, gearing with a similar wheel $a^4$, secured to the shaft $V^3$.

By means of the handle $a$ the operator may turn the wheel $R^4$ and its sleeve $R^3$, and this angular movement will be communicated by the shafts R and I to the cording-guides J in addition to the constant reciprocating movement. An angular movement corresponding to that of the cording-guides will also be imparted to the wheel $U^8$ and the pointer $U^9$, and the latter will thus always indicate the position in which the cording-guides J are reciprocating.

As the operator follows the pattern on the pantograph-board with the pointer of the pantograph, he will know by the direction in which he is moving the pointer what direction the pantograph-frame is being moved, and therefore in what position the cording-guides J should be reciprocating. The position of the latter will be indicated by the pointer $U^9$, and by means of the handle $a$ he is enabled to adjust the position of the cording-guides J from time to time as he follows the pattern to correspond with the change in direction of the movement of the pantograph-frame.

The pointer $U^9$ may be set one hundred and eighty degrees or half a revolution in advance of the cording-guides J, and the former should then always be adjusted so as to point in the direction in which the pantograph-frame is moved. This arrangement is found the most convenient in working. For example, we will suppose the pantograph-frame to be moved downward in a vertical line. If the pointer $U^9$ is adjusted so as to point in this direction, the cording-guides J will be half a revolution behind, that is, each will be vertically above its needle when in the center of its reciprocating movement.

By providing means for adjusting the position of the cording-guides J in addition to their constant reciprocatory movement the length of the latter movement may be reduced to, say, one quarter of a revolution instead of a complete revolution, as heretofore, and in addition the cording-guides will always bear the same relation to each stitch, that is, will be in advance of it, and the cord will thus always be held in tension when the stitch is made, and a superior class of work may thus be produced.

In order to secure a material, such as a braid, to the fabric by stitching through such braid instead of alternately on each side of it, as in the case of a cord, the shaft R is put out of gear with the lever T, so that it will not be reciprocated in the direction of its length, but will only receive and impart to the cording-guides J the angular adjusting movement given to it by the operator. By this means the braid may be laid by each guide J immediately under its corresponding needle each stitch and the needle will pass through it and sew it to the fabric, and thus by moving the pantograph-frame and the simultaneous angular adjustment of each cording-guide according to the direction of the movement of the pantograph-frame the pattern is braided in multiple on the fabric.

In the modification shown in Fig. 8 motion is communicated to the two shafts I by a vertical shaft $b$, carried in the bracket-bearings $b'$, secured to the framing. Secured to this shaft $b$ are bevel-toothed wheels $b^2$, in gear with bevel-toothed wheels $b^3$, secured to the shafts I. A continuous rotary motion is transmitted from the main shaft $T^9$ to the shaft $b$ (and from thence to the cording-guides by the shafts I) by a bevel-wheel $c$, secured to the shaft $T^9$, bevel-wheels $c'$ and $c^2$, mounted loosely on the shaft $c^3$, (the said shaft being carried in bearings $c^4$,) a bevel-wheel $c^5$, rotating on a pivot or short shaft $c^6$ at right angles to and secured to the shaft $c^3$, and bevel-wheels $c^7$ and $c^8$, mounted loosely on the shaft $c^3$, the latter wheel, $c^8$, engaging with a bevel-wheel $c^9$, secured to the shaft $b$.

It will be noted that in the train of wheels described the wheel $c^5$ engages with the wheels $c^2$ and $c^4$ and is also capable of moving round the shaft $c^3$ and the wheels $c^2$ and $c^4$, and thus forms an epicylic train of wheels.

By moving the epicylic wheel $c^5$ about the shaft $c^3$ the continuous movement imparted to the cording-guides J may be accelerated or retarded, and we thus have in the previous arrangement a means of adjusting the position of the cording-guides in addition to the continuous movement, so as to place the cording-guides in the same relative position for each stitch in whatever direction the pantograph-frame is moved.

The position of the wheel $c^5$ is adjusted by turning the shaft $c^3$, to which the pivot $c^6$ is secured, by means of a worm-wheel $d$, secured thereto, operated by a worm on the shaft $d$. The worm-wheel $d$ is adjusted simultaneously with an indicating-pointer in the same manner as the worm-wheel $R^4$ in the arrangement previously described. With this arrangement continuous rotary motion may be imparted to the shafts I, and consequently to the cording-guides, by locking the wheels $c'$ and $c^2$ together by means of the pin $c^{10}$, passing through the extensions $c^{11}$ and $c^{12}$ of the bosses of the wheels $c'$ $c^2$, or reciprocating motion may be obtained by means of an eccentric secured to the wheel $c'$, and the strap $e$ of which is connected by a rod $e'$ to the lever $e^2$, pivoted to the framing $e^3$. The wheel $c^2$ is connected to the lever $e^2$ by a link $e^5$, pivoted to an extension $e^4$ of the wheel $c^2$, which is thus reciprocated by the eccentric, the pin $c^{10}$ being at this time and for this purpose removed. The link $e^5$ is disconnected when the pin $c^{10}$ is replaced for continuously rotating the shafts I.

It will be seen that the angular adjustment of the wheel $c^5$ about the shaft $c^3$ will give the same result as the angular adjustment of the cam-sleeve R in the arrangement previously described, but it may be noted that the amplitude of the angular adjustment of the position of the wheel $c^5$ will necessarily in this arrangement be only half that required to adjust the guides, and the indicating-pointer must therefore be arranged so as to receive double the angular movement of the wheel $c^5$, so as to coincide with the position of the cording or braiding guides.

In order to produce greater regularity of work and what is known as a "floss-stitch" in shuttle embroidery-machines, I employ an automatic locking device in connection with both the needle and shuttle threads. With this arrangement both threads may be locked while the stitch is being made and released during the movement of the tissue and the movement of the pantograph rendered much easier. By the movement of the tissue sufficient of the shuttle and needle threads is drawn off to form the next stitch and by locking the threads before the stitch is made it insures that only the absolute length of thread drawn off is employed to make that stitch, and I am thus able to obtain a regularity of stitch which is impossible with the present thread-tension arrangements.

By increasing or decreasing the movement of the needle-thread-take-up bar and the length of traverse of the shuttles more or less thread is drawn off by the movement of the tissue, and I am thus enabled to make stitches either tight or loose, as required. By this means I am also enabled to vary the length of needle-thread and shuttle-thread given off in proportion to each other, so as to make stitches which produce different effects and also to compensate for the difference in the quality of material used for the needle and shuttle threads, respectively.

Figure 9:
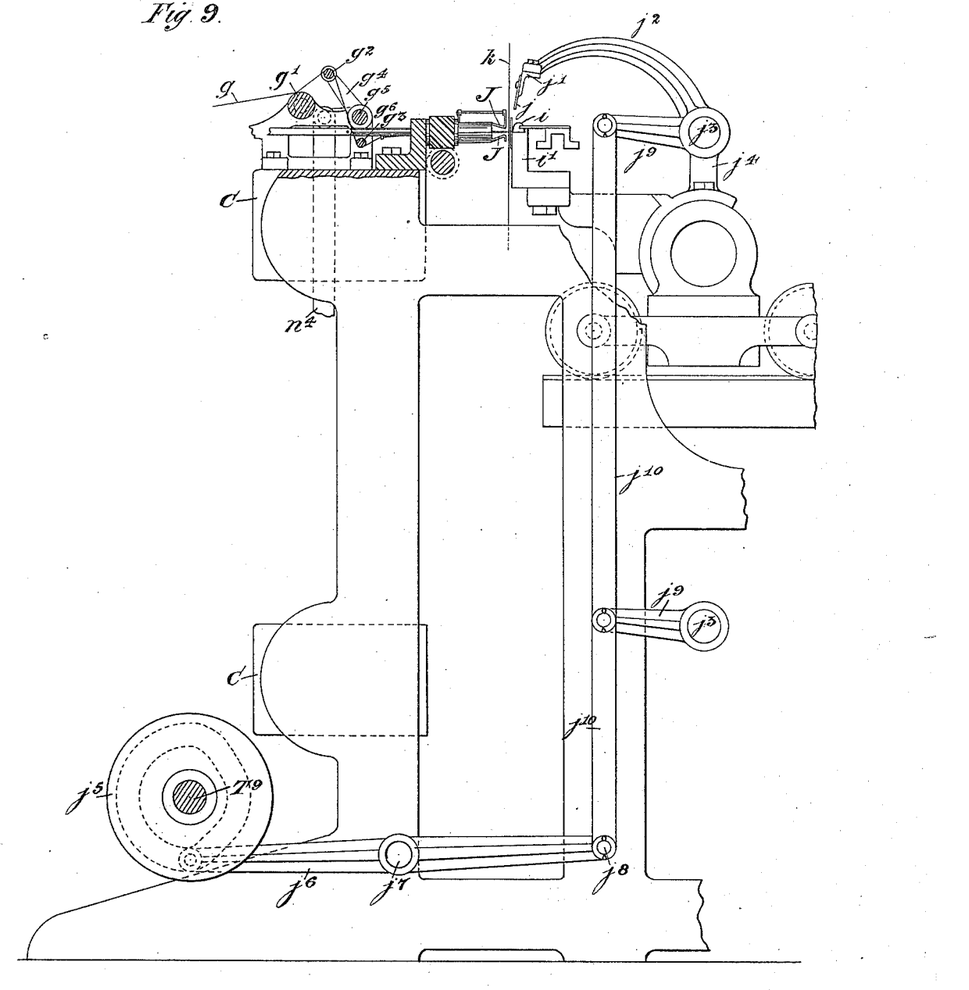
Fig. 9 is an end elevation showing part of my invention, parts only of the embroidery-machine being shown.

As shown in Fig. 9, the needle-threads $g$ on their way from the spools to the needles pass round the tension-roller $g'$, over the take-up bar $g^2$, (both of ordinary construction,) and under the bar $g^3$. The tension-roller $g'$ is alternately locked (while the stitch is made) and released (during the movement of the tissue) by means of a brake or other suitable arrangement actuated, preferably, by a cam on the main shaft $T^9$ in the usual manner.

The take-up bar $g^2$ is carried by arms $g^4$, secured to the rocking shaft $g^5$, carried in the bearings $g^6$, secured to the rail C of the framing and its movement is as follows: During the period in which the tension-roller $g'$ is released and the tissue is moved to make the next stitch the bar $g^2$ remains at or near the extremity of its outward movement, and during the period in which the tension-roller $g'$ is locked and the stitch is made it is moved inward at the same time as the needle, so as to give sufficient thread requisite for the passage of the shuttle, and it is returned to its outer position at the same time as the needle draws the thread $g$ tight and tightens the stitch.

If it is desired to give more or less thread for the making of the stitch than would be actually drawn off by the movement of the tissue, at the period when the tissue is moved and the tension-roller is released the bar $g^2$ is moved outward or away from the tissue beyond its normal position to draw off more thread, or moved inward or toward the tissue, so as to counteract the movement of the tissue and give off less thread. This movement takes place after the tension-bar $g'$ is released, so that for the purpose of tightening the stitch the bar $g^2$ always returns to the same position and a stitch with a loose or tight needle-thread may thus be made as required.

Figure 10:
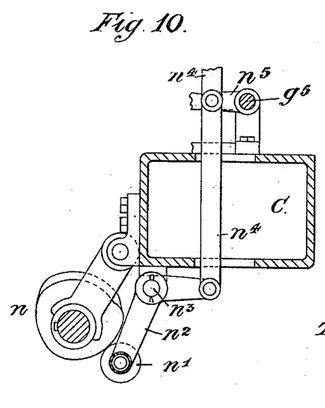
Fig. 10 is a side elevation, partly in section.
Figure 11:
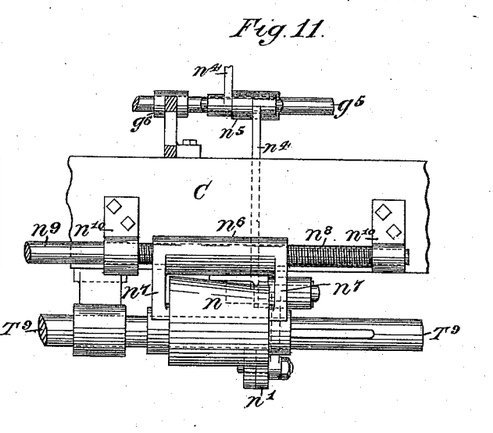
Fig. 11, a front elevation showing detail of the needle-thread-take-up operating-cam and connections.

In order to impart a varying movement to the take-up bar $g^2$, it is actuated by a cam $n$ with varying cam-surfaces at different parts of its length. (See Figs. 10 and 11.) It is carried by and is capable of being moved along the main shaft $T^9$, so that different parts of its length may operate the antifriction-roller $n'$ in contact therewith. The antifriction-roller $n'$ is carried by the bell-crank lever $n^2$, pivoted at $n^3$ to a bracket secured to the lower of the two rails C, the inner end of the lever $n^2$ being connected by a link $n^4$ to arm $n^5$, secured to the rocking shaft $g^5$, operating the take-up bar $g^2$, the take-up bars of the upper tiers being similarly connected by means of links $n^4$, a portion of one of which upper links is shown in Figs. 10 and 11.

The cam $n$ is moved laterally by the bracket $n^6$, provided with arms $n^7$, between which the cam rotates, and the said bracket is carried and actuated by the screwed part $n^8$ of the shaft $n^9$, carried in bearings $n^{10}$, secured to the lower of the rails C. The shaft $n^9$ is preferably continued to the pantograph end of the frame and is operated simultaneously with an indicator, if desired, by a suitable arrangement, so as to be under the control of the pantograph-operator.

The shuttle-threads $i^2$ (see Fig. 14) are locked by the spring-fingers $j$, arranged on the longitudinal bar $j'$ to correspond with the position of the shuttles $i$. Immediately the shuttles have passed through the loops in the needle-threads the bar $j'$ descends and each thread is held immediately behind the shuttles $i$, between the lower ends of the spring-fingers $j$ and the surface of the shuttle-race $j'$, and is retained while the needle-thread take-up tightens the stitch.

Figure 14:
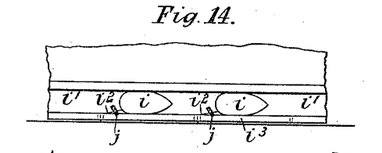
Fig. 14 is a plan of part of a shuttle-race, showing position of the shuttle-thread-locking fingers.

The bar $j'$ is raised to release the threads and permit of the return of the shuttles at the same time as the needle-threads are released and the tissue moved. By returning the shuttles to a point at a greater or less distance from the needle-holes in the cloth-plate $i^3$ more or less thread will be given off than would be actually drawn off by the movement of the tissue, and by this means I am enabled to make a stitch with a tight or loose shuttle-thread, as desired.

Figure 12:
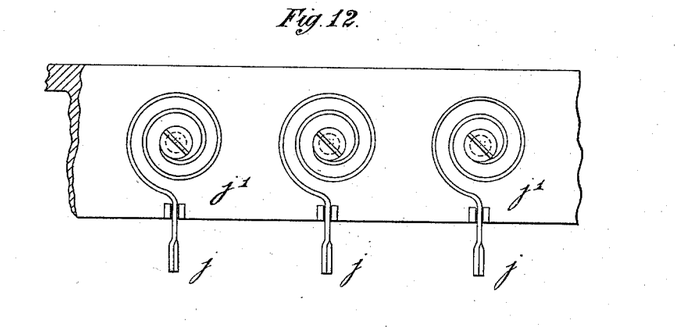
Fig. 12 is a front elevation showing detail of the shuttle-thread-locking bar.

The bar $j'$ is carried by arms $j^2$, (only one of which is shown in the accompanying drawings,) secured to the rocking shaft $j^3$, carried in the bearings $j^4$, secured to the shuttle-race wagon-framing, and is actuated by a cam $j^5$, secured on the main shaft $T^9$. The cam $j^5$ actuates through an antifriction-roller the lever $j^6$, which is pivoted to the framing at $j^7$ and is connected at $j^8$ by one or more links $j^{10}$ to arms $j^9$, secured to the rocking shafts $j^3$.

In the process of cording as hitherto practiced the needle-threads pass over the cord and are consequently shown prominently. The cord also has a tendency to follow a wavy course, the curves of which correspond to the length of the stitches.

Figure 13:
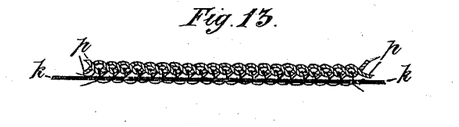
Fig. 13 is an enlarged view showing how the cord is attached to the fabric according to part of my invention.

To attach a cord to the tissue $k$, so that this tendency is obviated, and with concealed stitches, I employ two or more cording-guides J, actuating separate cords or strands, which may be carried on the same spool, which spool may, if desired, be subdivided according to the number of strands. The cords or strands $p$, as shown in Fig. 13, are twisted together to form a single cord by rotating the cording-guides J round the needle-thread continuously in one direction. The tension of one strand will counteract the tension of the other, both being equal, and each strand in turn will engage with the needle-thread and be attached to the tissue, the stitches being covered by the other strands.

When employing more than two cording-guides to each needle, less than half a revolution each stitch will be sufficient to engage one of the strands with the needle-thread, but in some cases it may be desirable to increase the movement of the guide, so as to give more twist to the cord.

When employing two cording-guides J, I place them preferably diametrically opposite one another, and when more than two are employed I preferably place them equidistant or nearly so.

I claim—

1. In an embroidery-machine such as described, the combination with the pantograph-frame, the needle-bar, and its operating mechanism, the cording or braiding guide and the operating-shaft therefor, of an epicyclic train of wheels, an indicating-pointer connected to the epicyclic wheel, and means for adjusting both coincidently; substantially as described.

2. In an embroidery-machine, such as described, the combination with the pantograph-frame, the needle-bar and its operating mechanism, the cording or braiding guide and the operating-shaft therefor, of an epicyclic train of wheels, mechanism for adjusting the epicyclic wheel according to the direction of the movement of the pantograph-frame, and means for reciprocating the epicyclic train; substantially as described.

In testimony whereof I have hereto set my hand in the presence of the two subscribing witnesses.

RUDOLPH WEISS.

Witnesses:
H. C. SHELDON,
JOSEPH PLAYER.